United States Patent [19]

Pittalis et al.

[11] Patent Number: 4,464,321

[45] Date of Patent: Aug. 7, 1984

[54] PROCESS FOR THE PREPARATION OF CHITOSAN FIBERS

[75] Inventors: Francesco Pittalis; Francesco Bartoli, both of Rome; Guido Giovannoni, S. Giuliano Milanese, all of Italy

[73] Assignee: Anic S.p.A., Palermo, Italy

[21] Appl. No.: 433,282

[22] Filed: Oct. 7, 1982

[30] Foreign Application Priority Data

Oct. 8, 1981 [IT] Italy .................................. 24398 A/81

[51] Int. Cl.³ ............................................. D02G 3/00
[52] U.S. Cl. ..................................... 264/83; 264/186; 264/209.1; 264/561; 428/398
[58] Field of Search .............. 264/83, 186, 561, 209.1; 260/123.7; 536/20; 106/162

[56] References Cited

U.S. PATENT DOCUMENTS

| | | | |
|---|---|---|---|
| 3,794,731 | 2/1974 | Dannert et al. | 264/83 |
| 3,962,158 | 6/1976 | Mima et al. | 210/500.2 |
| 4,029,727 | 6/1977 | Austin et al. | 264/186 |
| 4,145,391 | 3/1979 | Rodier | 264/83 |
| 4,309,534 | 1/1982 | Austin | 264/186 |
| 4,323,627 | 4/1982 | Joh | 264/561 |
| 4,378,017 | 3/1983 | Kosugi et al. | 260/123.7 |

FOREIGN PATENT DOCUMENTS

| | | | |
|---|---|---|---|
| 54-42424 | 4/1979 | Japan | 264/171 |
| 56-26049 | 3/1981 | Japan | 264/186 |

OTHER PUBLICATIONS

"Mechanical Prop. of Chitosan Membranes", by Clark et al., 5 pages, to be published in Ocean '78.

Primary Examiner—Jay H. Woo
Attorney, Agent, or Firm—Hedman, Gibson, Costigan & Hoare

[57] ABSTRACT

Hollow chitosan fibres for use in ultrafiltration processes are described, and which can be plasticized by the addition of glycerin such that they contain this latter in a quantity variable between 0.5 and 5% by weight with respect to the polymer. Said fibres are prepared by the wet spinning of acid chitosan solutions, using an alkali solution as the external fibre coagulant and a gaseous phase containing a basic gaseous component as the internal fibre coagulant.

5 Claims, 4 Drawing Figures

PROCESS FOR THE PREPARATION OF CHITOSAN FIBERS

This invention relates to hollow chitosan fibres for use in ultrafiltration and dialytic processes in general and renal dialysis in particular, and the process for their preparation. Chitosan is well known as a natural polymer prepared by the partial or total deacetylation of chitin, which is one of the main components of the exoskeleton of crustacea.

From the chemical aspect, chitosan can be described briefly as a compound in which one of the hydroxyl groups of the six term cellulose ring is substituted by an amino group. This characteristic determines the reactivity of chitosan towards organic and inorganic acids, with the formation of water-soluble salts. Films and membranes can be easily obtained from these solutions by evaporation or by coagulation with alkali.

The excellent dialytic and water permeability properties of chitosan membranes have made this material extremely interesting in terms of its possible use in ultrafiltration and dialytic processes.

In this respect, numerous processes are known for preparing flat membranes of chitosan or of mixtures of this compound either with other polymers or with substances of suitable molecular weight added either as strengthening material or, in certain cases, to control the selective permeability of the prepared membrane. On the other hand, the considerable advantages which hollow fibres have over flat membranes, such as their low filling volumes and the high exchange surface which can be obtained with minimum bulk, have led to an increasing interest in hollow fibres, which are used increasingly more frequently in ultrafiltration and dialytic processes. However, the methods usually used for preparing flat membranes, which are based essentially on evaporation followed by after-treatment either with heat or with alkali, or alternatively based on coagulation with alkali solutions, cannot be used for preparing hollow chitosan fibres.

In this respect, it is not possible to prepare hollow fibres by a spinning process based on the continuous evaporation of the considerable quantities of solvent and acid present in the normally prepared aqueous chitosan solutions. Likewise, a spinning process based on alkali solutions which not only have to come into contact with the outside of the fibre but must also be present in its interior, presents considerable difficulties because of the need to subsequently remove the alkaline solution contained in the fibre interior.

The present invention describes a process which enables hollow chitosan fibres having good dialytic and mechanical properties to be prepared. The fibres prepared by the claimed process can be used in ultrafiltration and dialytic processes, and have a diameter variable between 0.1 and 1 mm, with a thickness variable between 0.005 and 0.025 mm. Moreover, they can be plasticised by adding glycerin, in which case the final composition contains this substance to an extent variable between 0.5 and 5% by weight with respect to the polymer.

Said method is based on the wet spinning of solutions of chitosan in organic or inorganic acids, using alkali solutions as the external fibre coagulant and feeding into its interior a gaseous coagulant such as ammonia or a mixture of ammonia with other gases.

The chitosan solution is prepared by dissolving this polymer in a suitable acid, preferably acetic acid or formic acid, the concentration varying between 3.5 and 5% by weight with respect to the solution. The fibre is coagulated externally preferably by contact with a 1N NaOH solution, and is coagulated internally by feeding into its interior a gaseous phase consisting of ammonia or a gaseous mixture of ammonia with another gas which is inert towards chitosan, such as nitrogen or air. The composition of said gaseous mixture can vary between 40 and 100%.

As soon as they have coagulated, the fibres prepared by this process have a gel appearance characterised by a high water content. However, the fibres are self-supporting, and can be worked mechanically.

During drying, they undergo an irreversible water loss, by virtue of which they acquire mechanical consistency and their dialytic properties. When dried, the fibres can be collected in the form of skeins, and their interior is empty of the inert oily filling liquids such as isopropyl myristate or 2-ethylhexanol which are normally used in the preparation of fibres such as cellulose fibres.

If it is required to prepare plasticised fibres, glycerin is added to the polymer solution, the coagulant solution and to the wash waters.

The invention is described in detail by means of the following examples, which however are non-limiting.

EXAMPLE 1

3.5 g of chitosan prepared by 75% diacetylation of chitin extracted from prawn shells were dissolved in 100 ml of a solution containing 2% of acetic acid by weight. The solution was degassed by decantation in order to free it of the air bubbles trapped in its interior, and it was then filtered through a 500 mesh steel filter.

Figure 1:
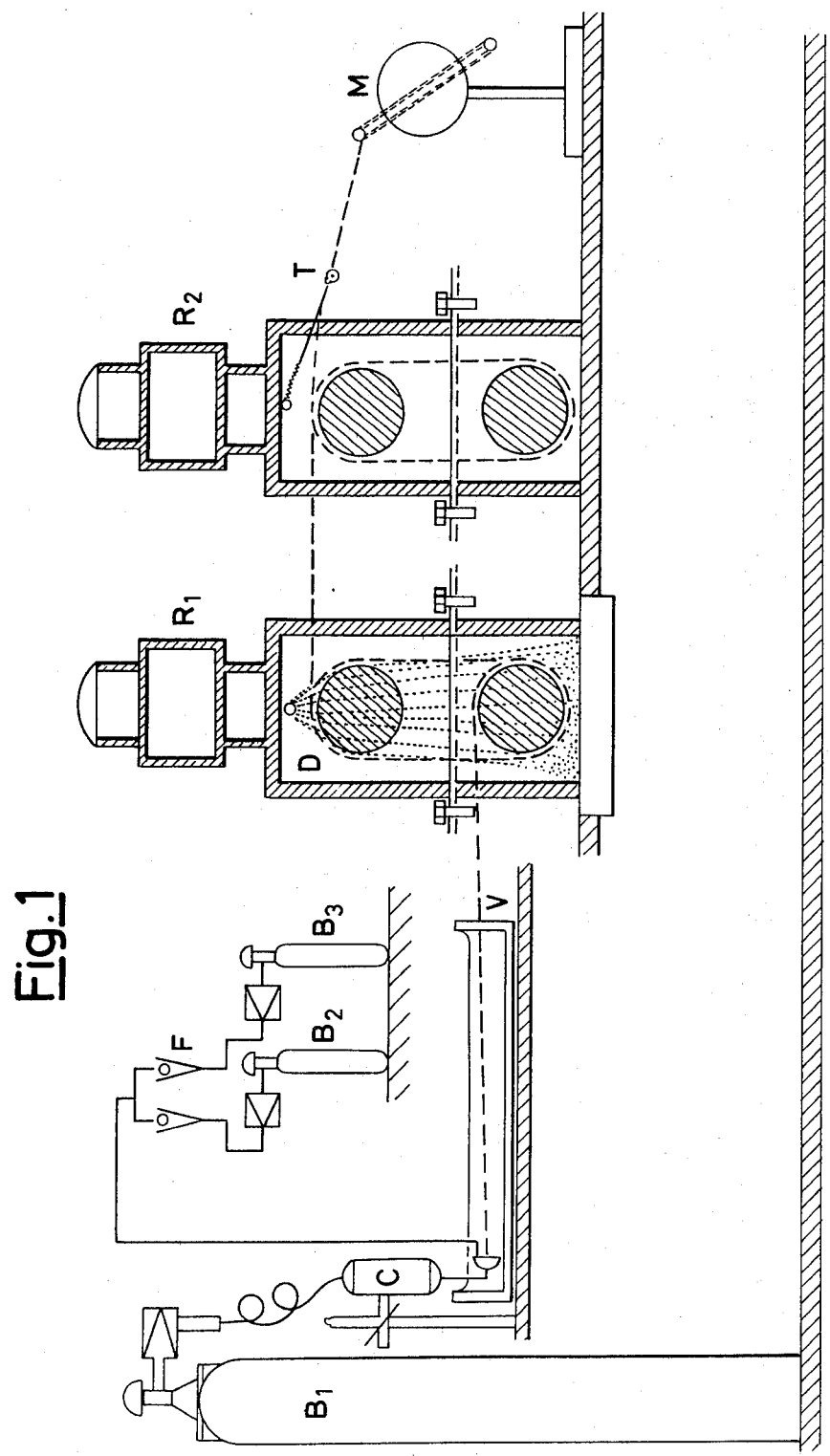
FIG. 1 is a diagram of a spinning device with associated supply tanks for feeding spinning solution, coagulation fluid and gaseous coagulating material.

The clear solution was spun by a hollow fibre spinneret comprising an annular ring ($\phi_{ext}=1$ mm, $\phi_{int}=0.6$ mm), through which the polymer passed, and a central bore ($\phi=0.2$ mm) through which the gaseous phase was fed. The spinning device is shown diagrammatically in FIG. 1. The chitosan solution, contained in the steel vessel C, was extruded by means of the pressure provided by the nitrogen cylinder $B_1$ such that the feed to the spinneret was 7 g/min.

The throughput and composition of the gaseous mixture fed into the interior of the fibre was adjusted by means of the flowmeters F, one of which was connected to the ammonia cylinder $B_2$ and the other to the air cylinder $B_3$. In this experiment, the mixture throughput was 0.84 l/h, and its composition was 40 volumes of air to 60 volumes of ammonia.

Figure 2:
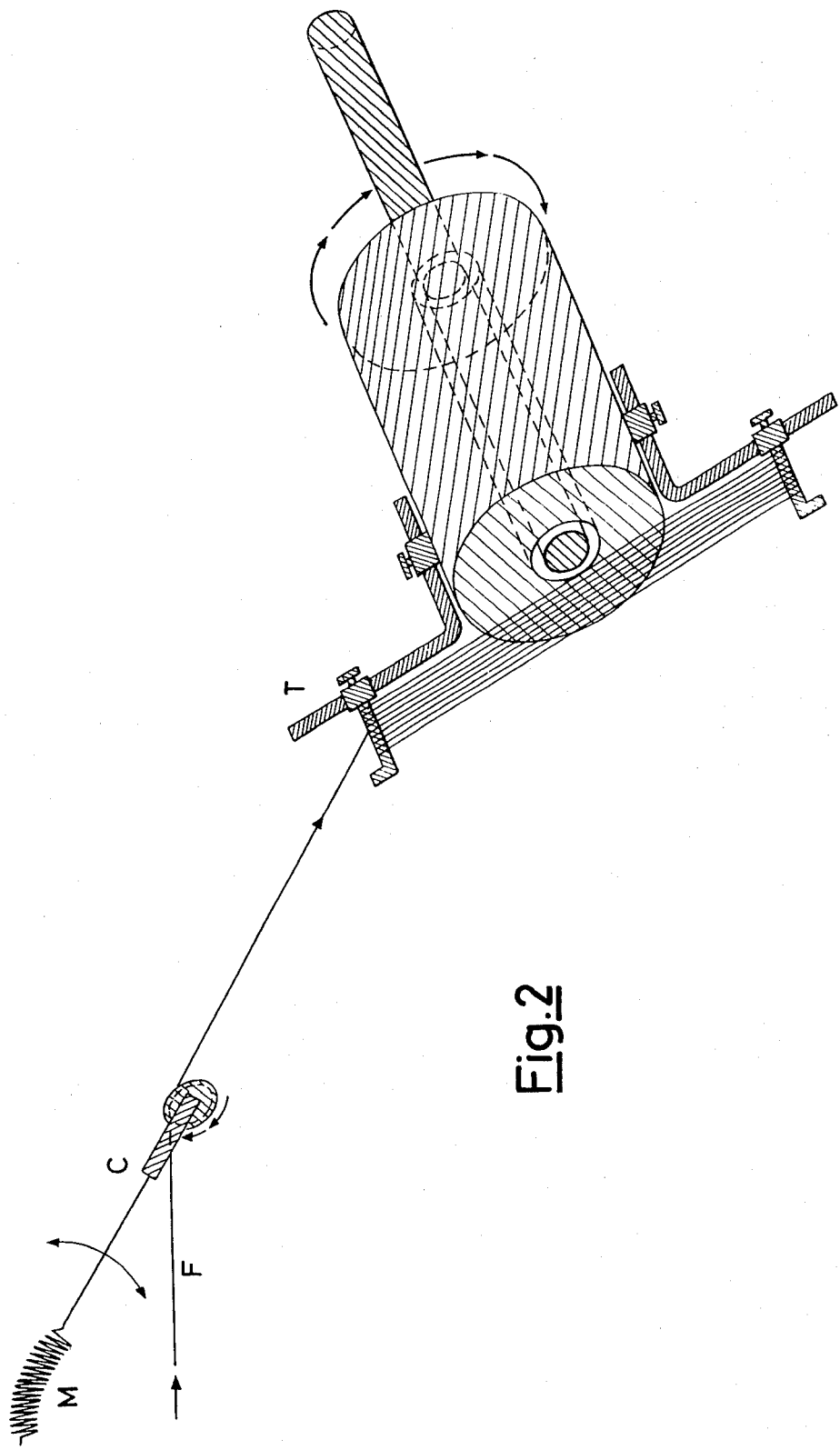
FIG. 2 is a diagram of a collection device for the spun hollow fibre.

On leaving the spinneret, the fibre passed through a coagulation tank containing 1N NaOH, and was then dragged by the first pair of rollers $R_1$, about which it was wound repeatedly to the extent that its total path was of length 8 m. The dragging speed was 14 m/min. During its passage about the rollers $R_1$, the fibre was washed by water sprayed from the nozzle D. The fibre then passed over the second pair of rollers $R_2$, which were heated such that their surface temperature was 60°–70° C. The dragging speed of the fibre about this second pair of rollers was again 14 m/min, and its path was about 30 m in length. The fibre was finally dried, kept under tension by the thread tensioner T, and collected by the skein former M. FIG. 2 shows a diagram of the collection device for the fibre F in greater detail. As can be seen, the fibre is collected in the form of skeins on the flat frame T of variable pitch, and is kept under tension by the slider C operated by the tension spring M.

The fibre obtained with the described device had a count of 17 g/km.

The water content of the coagulated but undried fibre was 23 g of water per g of dry polymer.

The moisture content of the fibre collected on the skein former was 13% with respect to the dry weight of the polymer. The diameter of the dried fibre was about 0.5 mm, and the wall thickness about 0.015 mm.

Figure 3:
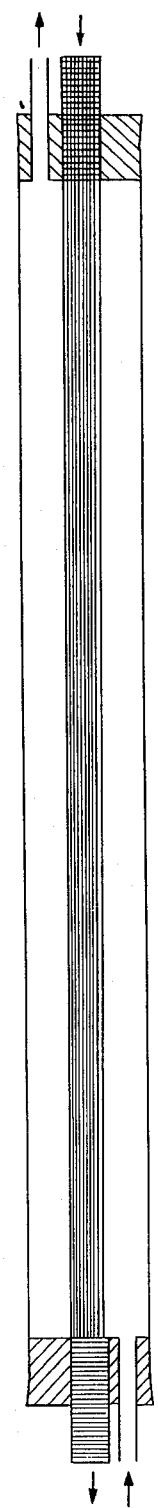
FIG. 3 is a diagram of a device for holding hollow fibers, made according to the invention, for use in a dialysis process.

The fibres for which the preparation has been described were assembled into small reactors shown diagrammatically in FIG. 3, and were subjected to measurements of their dialytic properties. In particular, the fibre permeability towards the following substances was measured: NaCl, urea, creatinine, uric acid, vitamin B12, inulin, cytochrome C and albumin.

Figure 4:
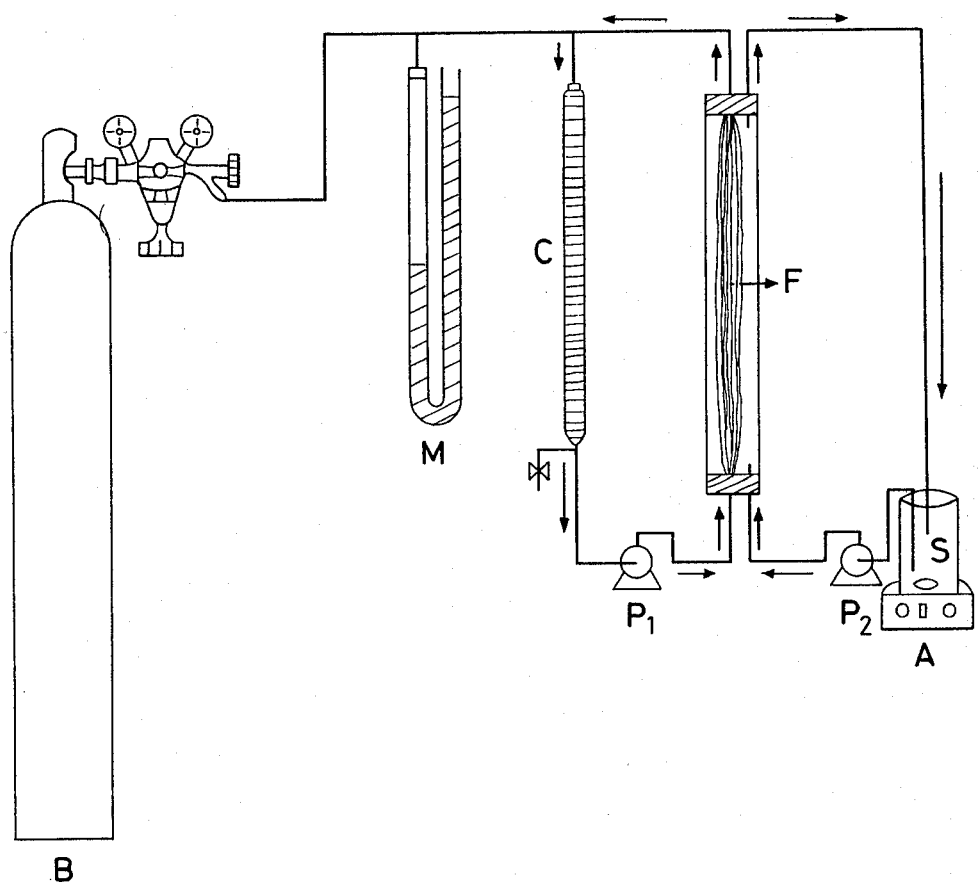
FIG. 4 is a diagram of a device for measuring the permeability of hollow fibres made according to the invention.

These measurements were made using the device shown in FIG. 4, following the method of E. Klein, F. Holland, A. Lebeouf, A. Donnaud and J. K. Smith in Journal of Membrane Science, 371396 (1976).

The solution containing the substance to be examined was circulated by the peristaltic pump $P_1$ through the circuit comprising the fibres F contained in the reactor and the calibrated burette C. This circuit could be pressurised by means of the nitrogen cylinder B to the pressure indicated on the manometer M, and the volume variations of the solution could be followed by means of the graduated burette C. A known volume of distilled water was circulated by the peristaltic pump $P_2$ through a second circuit comprising the reactor jacket and the vessel S. The quantity of substance which had diffused through the fibres was determined by withdrawing periodic samples from the vessel S, the contents of which were kept stirred by the stirrer A.

The following results were obtained:

TABLE 1

| Substance | Permeability $cm^2/sec.$ |
| --- | --- |
| NaCl | $2.25 \times 10^{-6}$ |
| Urea | $2.10 \times 10^{-6}$ |
| Uric acid | $7.0 \times 10^{-7}$ |
| Creatinine | $3.10 \times 10^{-6}$ |
| Vitamin B12 | $2.8 \times 10^{-7}$ |
| Inulin | $17.0 \times 10^{-8}$ |
| Cytochrome | $17.0 \times 10^{-9}$ |
| Albumin | — |

The fibres contained in the described reactors were subjected to rupture tests by applying increasing pressure. No fibre ruptures were observed for pressures up to 600 mm Hg.

EXAMPLE 2

5 g of chitosan were dissolved in 100 ml of a solution containing 2% of acetic acid by weight.

The solution was spun under the same conditions as example 1. Fibres were obtained which differed from those of the preceding example with regard to the count, which was 25 g/km, and the thickness, which was 0.025 mm.

The permeability values for this type of fibre were as follows:

TABLE 2

| Substance | Permeability $cm^2/sec.$ |
| --- | --- |
| NaCl | $1.90 \times 10^{-6}$ |
| Urea | $2.10 \times 10^{-6}$ |
| Uric acid | $6.0 \times 10^{-7}$ |
| Creatinine | $2.20 \times 10^{-6}$ |
| Vitamin B12 | $11.2 \times 10^{-8}$ |
| Cytochrome | $10.2 \times 10^{-9}$ |
| Albumin | — |

The rupture resistance was greater than 600 mm Hg.

EXAMPLES 3–4

Solutions of chitosan at a concentration of 3.5 and 5% in acetic acid were spun as described in examples 1 and 2 respectively, but with the difference that glycerin was added both to the polymer and coagulant solutions and to the wash waters.

The glycerin concentration in said solutions was 2 g/l. The glycerin concentration in the dried fibres was found to be 3% by weight with respect to the dry polymer. The fibres plasticised with glycerin were subjected to permeability measurement, and the following values were obtained:

TABLE 3

| Substance | Permeability 3.5% chitosan $cm^2/sec.$ | Permeability 5% chitosan $cm^2/sec.$ |
| --- | --- | --- |
| NaCl | $2.50 \times 10^{-6}$ | $2.30 \times 10^{-6}$ |
| Uric acid | $6.5 \times 10^{-7}$ | $6.8 \times 10^{-7}$ |
| Creatinine | $4.40 \times 10^{-6}$ | $4.10 \times 10^{-6}$ |
| Vitamin B12 | $4.2 \times 10^{-7}$ | $3.0 \times 10^{-7}$ |
| Inulin | $20.4 \times 10^{-8}$ | $25.0 \times 10^{-8}$ |
| Cytochrome C | $11.0 \times 10^{-9}$ | $10.3 \times 10^{-9}$ |
| Albumin | — | — |

The fibre rupture resistance was greater than 600 mm Hg.

EXAMPLE 5

3.5 g of chitosan were dissolved in 100 ml of a solution containing 1.5% of formic acid by weight. The solution was spun as in example 1. The fibres were measured for their dialytic properties, and the following values were obtained:

TABLE 4

| Substance | Permeability $cm^2/sec$ |
| --- | --- |
| NaCl | $3.0 \times 10^{-6}$ |
| Urea | $3.4 \times 10^{-6}$ |
| Uric acid | $6.0 \times 10^{-7}$ |
| Creatinine | $5.5 \times 10^{-6}$ |
| Vitamin B12 | $3.5 \times 10^{-7}$ |
| Inulin | $25.0 \times 10^{-8}$ |
| Cytochrome C | $22.0 \times 10^{-9}$ |

The fibre rupture pressure was greater than 600 mm Hg.

EXAMPLE 6

3.5 g of chitosan were dissolved in 100 ml of a solution containing 2% of acetic acid by weight. The solution was spun as in example 1, but with the difference that 7% drafting was imposed between the first and second pair of rollers. In this respect, the first pair of rollers dragged the fibre at a speed of 14 m/min., while the second pair dragged it at a speed of 15 m/min.

In this manner, fibres were obtained having a diameter of 0.3 mm and a wall thickess of 0.013 mm. The fibre count was 16 g/km.

The fibre dialytic characteristics were as follows:

TABLE 5

| Substance | Permeability cm$^2$/sec |
|---|---|
| NaCl | $2.8 \times 10^{-6}$ |
| Urea | $2.0 \times 10^{-6}$ |
| Uric acid | $8.0 \times 10^{-7}$ |
| Creatinine | $5.8 \times 10^{-6}$ |
| Vitamin B12 | $3.5 \times 10^{-7}$ |
| Inulin | $20.4 \times 10^{-8}$ |
| Cytochrome C | $17.2 \times 10^{-9}$ |
| Albumin | — |

The rupture pressure for this type of fibre was greater than 600 mm Hg.

We claim:

1. A process for preparing hollow chitosan fibres usable in ultrafiltration and dialytic processes, having a size of between 0.1 and 1 mm. and a thickness of between 0.005 and 0.025 mm. said process comprising wet spinning an acid solution of chitosan through a suitable hollow fibre spinneret, and using an alkali solution as the external fibre coagulant and a gaseous phase containing a basic gaseous component as the internal fibre coagulant.

2. A process as claimed in claim 1, wherein the chitosan solution is prepared by dissolving this polymer in acetic or formic acid, the polymer concentration lying between 3.5 and 5% by weight with respect to the solution.

3. A process for preparing hollow chitosan fibres as claimed in claims 1 or 2, characterized in that the polymer solution and the coagulate contain glycerin.

4. A process for preparing hollow chitosan fibres as claimed in claim 1 wherein the gaseous component is ammonia.

5. A process for preparing hollow chitosan fibres as claimed in claim 2 wherein the gaseous component is ammonia.

* * * * *